(12) United States Patent
Pearson et al.

(10) Patent No.: US 8,379,090 B1
(45) Date of Patent: Feb. 19, 2013

(54) VIRTUAL VISITS

(75) Inventors: Nathaniel Pearson, Minneapolis, MN (US); Gwen Michael, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 403 days.

(21) Appl. No.: 12/613,054

(22) Filed: Nov. 5, 2009

Related U.S. Application Data (60) Provisional application No. 61/111,929, filed on Nov. 6, 2008.

(51) Int. Cl.
*H04N 7/18* (2006.01)
*H04N 5/225* (2006.01)
*H04N 5/232* (2006.01)
*H04N 1/232* (2006.01)

(52) U.S. Cl. .................. 348/159; 348/154; 348/207.11; 348/211.8; 348/211.13

(58) Field of Classification Search .................. None
See application file for complete search history.

(56) References Cited

U.S. PATENT DOCUMENTS

| | | | |
|---|---|---|---|
| 4,576,578 A | 3/1986 | Parker et al. | |
| 5,583,796 A * | 12/1996 | Reese | 702/185 |
| 6,236,955 B1 | 5/2001 | Summers | |
| 6,434,320 B1 * | 8/2002 | Orth et al. | 386/241 |
| 6,549,893 B1 | 4/2003 | Lannert et al. | |
| 6,755,659 B2 | 6/2004 | LoSasso et al. | |
| 7,300,287 B2 | 11/2007 | Dowdell et al. | |
| 7,881,585 B2 * | 2/2011 | Reese et al. | 386/200 |
| 2001/0023059 A1 | 9/2001 | Toki | |
| 2003/0098910 A1 * | 5/2003 | Kim | 348/150 |
| 2005/0004789 A1 | 1/2005 | Summers | |
| 2005/0007479 A1 * | 1/2005 | Ahiska | 348/335 |
| 2005/0071046 A1 * | 3/2005 | Miyazaki et al. | 700/245 |
| 2005/0165645 A1 | 7/2005 | Kirwin | |
| 2006/0161464 A1 | 7/2006 | Green | |
| 2006/0238548 A1 * | 10/2006 | Stotts, Jr. et al. | 345/629 |
| 2007/0083415 A1 | 4/2007 | Forrest et al. | |
| 2007/0271587 A1 | 11/2007 | Rowe | |
| 2007/0299710 A1 | 12/2007 | Haveliwala | |
| 2008/0129816 A1 * | 6/2008 | Mattila et al. | 348/14.08 |
| 2009/0024331 A1 * | 1/2009 | Tomaney et al. | 702/19 |

* cited by examiner

*Primary Examiner* — Joseph Ustaris
*Assistant Examiner* — Edemio Navas, Jr.
(74) *Attorney, Agent, or Firm* — Nixon & Vanderhye P.C.

(57) ABSTRACT

A collaborative video touring method may allow local personnel of a facility and users who are located remotely from the facility to interactively participate in a virtual visit of the facility, during which the local personnel and the remote users may tour a number of different areas of the facility. In some implementations, the visited facility may have a video monitoring system with one or more adjustable video cameras, each of which may be directed at different areas of the facility, and the video captured by the various cameras may be displayed concurrently to the local personnel and to the remote users. Such concurrent display may, in some embodiments, allow the users at the different locations to interactively discuss the video being displayed, similar to if the remote users were physically touring the facility with the local personnel.

18 Claims, 4 Drawing Sheets

VIRTUAL VISITS

CROSS-REFERENCE TO RELATED APPLICATION

This Application claims priority under 35 U.S.C. §119(e) to U.S. Provisional Application Ser. No. 61/111,929, filed on Nov. 6, 2008, and entitled "Virtual Visits."

BACKGROUND

Corporate personnel of retail and other consumer businesses may visit their different store locations for a variety of reasons. For example, in-store visits are sometimes made to determine store cleanliness, to determine whether shelves are appropriately stocked, to determine parking lot cleanliness and safety, and to review store operations, such as guest services and asset protection processes, etc. In-store visits may also be used for training purposes, such as to train personnel at a particular store, e.g., on how to maintain and operate the store's video monitoring systems.

In-store visits typically involve multiple people physically traveling to one or more stores. For example, a field team made up of various experts in different areas of store operations may travel together to a store to evaluate the store and to provide feedback or other recommendations for store improvements. These recommendations may include improvements in cleanliness, average wait times, display of merchandise, stock levels, and the like.

Follow-up in-store visits may also be used to determine whether recommendations made during a previous visit have been acted upon. For example, during an initial in-store visit, a corporate representative may recommend that the store manager set up a particular display in a different manner that may be more likely to lead to customer purchases. On a follow-up visit a couple of weeks later, the corporate representative may check to make sure that the display had been appropriately changed.

Video monitoring systems may be used to monitor retail locations for various purposes. In particular, video monitoring systems may be used to monitor different locations within the interiors of a retail store, such as high-traffic aisles, security-sensitive areas, and the like. Video monitoring systems may also be used to monitor locations at the exteriors of a retail store, such as parking lots, loading docks, external doors, etc.

SUMMARY

A collaborative video touring method may allow local personnel of a facility and users who are located remotely from the facility to interactively participate in a virtual visit of the facility, during which the local personnel and the remote users may tour a number of different areas of the facility. In some implementations, the visited facility may have a video monitoring system with one or more adjustable video cameras, each of which may be directed at different areas of the facility, and the video captured by the various cameras may be displayed concurrently to the local personnel and to the remote users. Such concurrent display may, in some embodiments, allow the users at the different locations to interactively discuss the video being displayed, similar to if the remote users were physically touring the facility with the local personnel.

In some implementations, the remote users may be able to control the cameras of the facility, such as by selecting which of the video feeds to display, by adjusting the quality of the video, or by panning, tilting, or zooming the cameras. In certain aspects, the virtual tour may include live video feeds shown concurrently with stored video that was captured by the same camera, but at a different time, and the live and previous video footage may be compared to determine whether any changes had occurred at the particular area depicted in the video. According to some embodiments, the virtual tour may also include video footage from a device that is not part of the facility's video monitoring system, such as video captured by a portable video recording device that is being operated by someone at the facility.

The details of one or more implementations are set forth in the accompanying drawings and the description below. Other features, objects, and advantages will be apparent from the description and drawings, and from the claims.

DETAILED DESCRIPTION OF ILLUSTRATIVE IMPLEMENTATIONS

Figure 1:
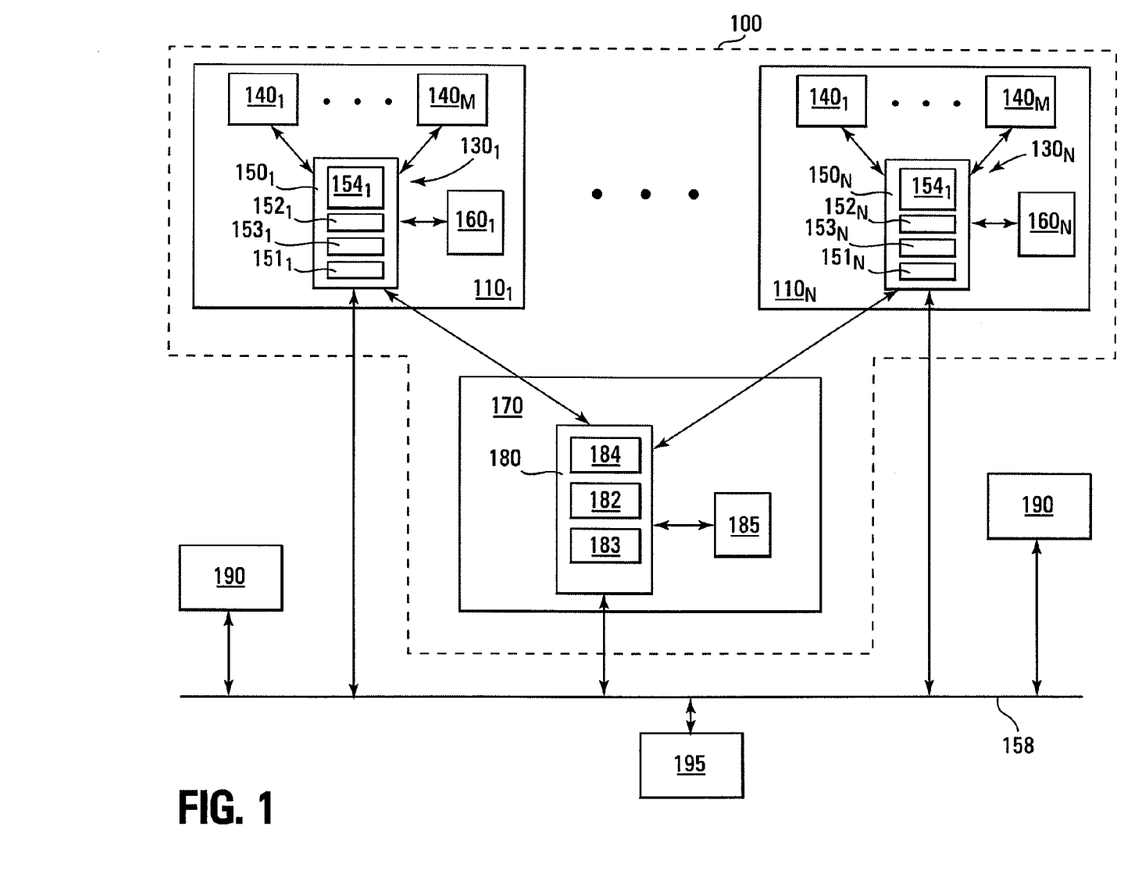
FIG. 1 is a conceptual diagram of a monitoring network.

FIG. 1 is a conceptual diagram of a monitoring network 100 that may be distributed over one or more communications channels, such as a local area network (LAN), a wide area network (WAN), etc. As shown, the monitoring network 100 may include multiple locations, such as one or more facilities 110$_1$-110$_N$. These facilities 110 may include, for example, retail stores, warehouses, athletic facilities, banks, etc. The monitoring network 100 may also include a monitoring system 130 at each of the locations 110. For example, facilities 110$_1$-110$_N$ may respectively have monitoring systems 130$_1$-130$_N$, such as video monitoring systems. Each of the monitoring systems 130$_1$-130$_N$ may have one or more monitoring devices, such as cameras 140$_1$ to 140$_M$ (e.g., digital or analog video cameras, still-capture cameras, or the like). These monitoring devices 140 may each be coupled to a computer 150, such as a local server. For example, monitoring systems 130$_1$ to 130$_N$ may respectively be coupled to local computers 150$_1$ to 150$_N$.

The cameras 140 may each be directed at specific areas within a facility 110, such as at different point-of-sale areas, a guest services area, a stockroom, jewelry and electronics cases, entrances and exits of the facility, areas designated as security zones, various displays, etc. The cameras 140 may also be directed at areas outside of the facility 110, such as a loading dock, a parking lot, etc. Although each of the facilities is shown with M different cameras, it will be appreciated that each of the various facilities 110 may have a different number of cameras.

Each computer 150 may have a storage device 151 (e.g., storage devices 151$_1$ to 151$_N$ respectively of computers 150$_1$ to 150$_N$), such as a hard drive, a solid state drive, a removable flash drive, etc., for storing video from each of cameras 140. Each computer 150 may also include a processor 152 (e.g., processors 152$_1$ to 152$_N$ respectively of computers 150$_1$ to 150$_N$) for processing computer-readable instructions. These computer-readable instructions may be stored in a memory 153 (e.g., memories $153_1$ to $153_N$ respectively of computers $150_1$ to $150_N$), such as a computer-readable storage medium of each computer 150. In various implementations, the computer-readable instructions may be in the form of software, firmware, hardware, or a combination thereof.

Each computer 150 may also include user interface devices, such as a video display 154, a keyboard (not shown) for inputting information into the computer 150, audio speakers (not shown), a microphone (not shown), and a pointing device (not shown), such as a mouse, for navigating a pointer on the display 154 of the respective computer 150. In various implementations, the computers 150 may be personal computers, servers, data centers, or the like. Each of the computers 150 may be coupled to a data network 158, such as the Internet.

The computer-readable instructions stored in the memory 153 of each computer 150 may be configured to facilitate control of the cameras 140 coupled to the respective computer 150. For example, each computer 150 may be configured to adjust the pan angle, the tilt angle, and/or the zoom of a camera 140 in response to user inputs into the respective computer 150 in implementations where the cameras 140 include pan-tilt-zoom functionality. The computer-readable instructions for each computer 150 may further be configured to facilitate adjustment of the quality of the video captured by each camera 140, e.g., by adjusting the frame rate and/or the image quality, in response to user inputs into the respective computer 150.

Other computers 160, e.g., personal computers, may also be located at each facility 110 and may be coupled to the computer 150 located at that facility 110. Each of these computers 160 may include a processor for processing computer-readable instructions. In some implementations, the computer-readable instructions may be stored in a memory of each computer 160, such as a computer-readable storage medium, and may be in the form of software, firmware, hardware, or a combination thereof. Each computer 160 may also include user interface devices such as a video display (not shown), a keyboard (not shown), audio speakers (not shown), a microphone (not shown), and/or a pointing device (not shown). The computers 160 at each facility 110 may access the data network 158 via the computer 150 at the respective facility 110. Alternatively, the computers 160 may be configured to access the data network 158 directly.

Computer-readable instructions stored in the memory of each computer 160 may be configured to facilitate control of the cameras 140 through the computer 150 to which the respective computer 160 is coupled. That is, a computer 160 at a particular facility 110 may be configured to control the cameras 140 at that particular facility 110. For example, each of the computers $160_1$ at facility $110_1$ may be configured to adjust the pan angle, the tilt angle, and/or the zoom of the cameras $140_1$ to $140_M$ of monitoring system $130_1$ at facility $110_1$ in response to user inputs into the one or more computers $160_1$. Each of the computers $160_1$ at facility $110_1$ may be further configured to adjust the quality of the video captured by each of the cameras $140_1$ to $140_M$ at facility $110_1$, e.g., by adjusting the frame rate and/or image quality, in response to user inputs into the computers $160_1$. In some implementations, a computer 160 may be coupled to the cameras 140 via a computer 150, and thus a computer 160 may be able to control any of the cameras 140 via the computer 150.

Similarly, each of the computers $160_N$ at facility $110_N$ may be configured to adjust the pan angle, the tilt angle, and/or the zoom of any of the cameras $140_1$ to $140_M$ of monitoring system $130_N$ at facility $110_N$ in response to user inputs into the computers $160_N$. Each of the computers $160_N$ at facility $110_N$ may be further configured to adjust the quality of the video captured by each of the cameras $140_1$ to $140_M$ at facility $110_N$, e.g., by adjusting the frame rate and/or image quality, in response to user inputs into the computers $160_N$.

A remote location or facility 170, such as a central location, e.g., a headquarters for the one or more facilities 110, may be located remotely from the facilities 110. Facility 170 may include a computer 180, such as a network (e.g., web-based) server, as part of a monitoring network 100. The computer 180 may be communicatively coupled to the computers $150_1$ to $150_N$ of the monitoring systems $130_1$ to $130_N$ located at facilities $110_1$ to $110_N$. Computer 180 may include a processor 182 for processing computer-readable instructions. These computer-readable instructions may be stored in a memory 183, such as a computer-readable storage medium, and may be in the form of software, firmware, hardware, or a combination thereof. Computer 180 may be a personal computer, a server, a data center, or the like, and may include a video display 184, a keyboard (not shown) for inputting information into the computer 180, audio speakers (not shown), a microphone (not shown), and a pointing device (not shown), such as a mouse, for navigating a pointer on the display 184. Computer 180 may be communicatively coupled to the data network 158.

The computer-readable instructions stored in the memory 183 of computer 180 may be configured to facilitate remote control of the monitoring system 130, and thus to remotely control cameras $140_1$ to $140_M$ of monitoring system 130, located in any one of facilities $110_1$ to $110_N$ via a respective one of computers $150_1$ to $150_N$. For example, computer 180 may be configured to send signals to any of the cameras $140_1$ to $140_M$, in response to user inputs into computer 180, via computer $150_1$. In such an implementation, computer $150_1$ may be configured to send signals to the cameras $140_1$ to $140_M$ in response to receiving the signals from computer 180 for controlling any of the cameras $140_1$ to $140_M$.

For example, computer 180 may be configured to facilitate remotely adjusting the pan angle, the tilt angle, and/or the zoom of the cameras $140_1$ to $140_M$ of monitoring system $130_1$ at facility $110_1$ via computer $150_1$ in response to user inputs into computer 180. Computer 180 may further be configured to adjust the quality of the video captured by each of the cameras $140_1$ to $140_M$ at facility $110_1$ via computer $150_1$, e.g., by adjusting the frame rate and/or image quality, in response to user inputs into computer 180.

One or more other computers 185, e.g., personal computers, servers, data centers or the like, may also be located at facility 170 and may be communicatively coupled to computer 180. The computers 185 may include a processor for processing computer-readable instructions. These computer readable instructions may be stored in a memory of each computer 185, such as a computer-readable storage medium, and may be in the form of software, firmware, hardware, or a combination thereof. The computers 185 may also include one or more user interface devices, such as a video display (not shown), a keyboard (not shown), audio speakers (not shown), a microphone (not shown), and/or a pointing device (not shown). In some implementations, the computers 185 may be configured to access the data network 158 via computer 180. Alternatively, the computers 185 may be configured to directly access the data network 158.

The computer-readable instructions stored in the memory of the computers 185 may be configured such that the computers 185 can remotely control the cameras $140_1$ to $140_M$ located in facilities $110_1$ to $110_N$. That is, a computer 185 may control the cameras $140_1$ to $140_M$ located in any one of facilities $110_1$ to $110_N$ via computer 180, either directly, or respectively through computers $150_1$ to $150_N$. For example, the computers 185 may be configured to remotely adjust the pan angle, the tilt angle, and/or the zoom of one or more cameras $140_1$ to $140_M$ of monitoring system $130_1$ at facility $110_1$ via computer 180 (and possibly via computer $150_1$) in response to user inputs into the respective computer 185. Each of the computers 185 may be further configured to adjust the quality of the video captured by each of the cameras $140_1$ to $140_M$ at facility $110_1$ via computer 180 and/or via computer $150_1$, e.g., by adjusting the frame rate and/or image quality, in response to user inputs into the respective computer 185.

One or more external computers 190 may be located remotely from the monitoring network 100 and may be communicatively coupled to the data network 158. The external computers 190 may be located at hotels, libraries, or anywhere they can access data network 158. For example, an external computer 190 may be a portable computer that is removably coupleable to data network 158. The external computers 190 may include processors for processing computer-readable instructions. These computer-readable instructions may be stored in a memory, such as a computer-readable storage medium, of each external computer 190 and may be in the form of software, firmware, hardware, or a combination thereof. Each external computer 190 may also include user interface devices such as a video display (not shown), a keyboard (not shown), audio speakers (not shown), a microphone (not shown), and/or a pointing device (not shown). In some implementations, the external computers 190 may communicate with computer 180 over data network 158.

Using the monitoring network 100 as described above, any one of facilities $110_1$ to $110_N$ can be virtually visited by a remote user viewing live video from that facility 110, such as digital or analog video or pictures. Similarly, a user may conduct a virtual visit by viewing archived video or pictures from a facility 110, e.g., digital or analog video or pictures on a storage device 151 of the computer 150 of that facility 110. For example, a virtual visit of facility $110_1$ may involve displaying video from one or more of cameras $140_1$ to $140_N$ of facility $110_1$ on a display 184 of computer 180 and/or a display of one or more of the computers 185. In addition, the same video may be displayed concurrently on any of the displays $154_1$ to $154_N$ respectively of computers $150_1$ to $150_N$, on computers 160, and/or on one or more of the external computers 190. By allowing concurrent displays of such video content, multiple users located in different areas may all participate in a single virtual visit to a facility.

It should be understood that distributing and displaying video over a network may include some amount of inherent delay, such as delay caused by network bandwidth issues, routing delays, and the like. As such, the term concurrently is meant to include video being displayed on different computers at precisely the same exact time, as well as video being displayed with some minor time delays between the different computers, such that the computers participating in a virtual visit may not display the video at precisely the same exact time. In some implementations, software running on computers displaying the video stream take into account any potential video or audio delay such that the video stream is displayed on the different computers at the same exact time.

A virtual visit of different areas of a facility may be accomplished by displaying video from various cameras respectively directed at a number of particular areas. Additionally, different areas may be visited using a single camera by panning, tilting, and/or adjusting the zoom of a particular camera to capture the different areas. Similarly, different areas of a facility may be visited by panning, tilting, and/or adjusting the zoom of two or more different cameras to capture the different areas.

Virtual visits may be controlled or facilitated using a computer housed at a central location 170, such as computer 180 or 185. For example, video from any of the cameras $140_1$ to $140_M$ at facility $110_1$ may be sent to the computer used to control or facilitate the functions of the visit, e.g., in response to a request from the computer based on user input into that computer. The computer used to control the visit may then display the video and send the video to other computers that are participating in the virtual visit for display, such as one or more of computers $150_1$ to $150_N$, one or more of computers 160, and/or one or more of external computers 190. In addition, one or more of the computers at the facility 110 being visited may also participate in the visit, e.g., via computers 150 and/or computers 160. The computer used to control the visit may also send video back to the participating computers at the facility 110 being visited for display thereon.

The computer used to facilitate the visit may select, in response to user inputs, what areas of a facility 110 are visited by selecting the cameras 140 respectively directed at those areas and by causing video from the selected cameras 140 to be displayed concurrently at the various participating computers and at the computer used to control the visit. The computer used to facilitate the visit, in response to user inputs, may also control a selected camera 140, e.g., by panning, tilting, and/or zooming the selected camera 140, to capture different views of the general area in which the selected camera 140 is located or to capture areas of the facility 110 being visited that are within the range of the selected camera 140. Such control of the selected camera 140 may alternatively or additionally be accomplished by one or more users at a facility 110 being visited using computers 150 or 160 at that facility 110. For example, during a virtual visit, the control of the monitoring system 130 at the facility 110 being visited may be turned over to individuals at that facility 110 from an individual operating the computer used to facilitate the virtual visit.

The computer used to control the virtual visit may select different cameras 140 from which to receive live video in response to user inputs into the computer used to control the virtual visit. In some implementations, the computer used to control the virtual visit may access a camera directory of a computer 150 of the facility 110 being visited, causing the directory to display on the computer used to control the virtual visit. For example, the camera directory may be displayed on the computer used to control the virtual visit in response to user input, and the user may select the desired camera from the displayed directory. In some implementations, the user may select a camera from the camera directory for the facility, and the computer that is controlling the virtual visit may send a request to the facility being visited for the live video recorded by the camera selected in response to the user selecting that camera. The camera directory may also contain identifiers, such as names or descriptors, of the locations of the cameras or of the areas at which the cameras are nominally directed or are capable of capturing, and the user may select a camera by selecting an identifier. The camera directory may also be user-searchable such that the appropriate cameras for the virtual visit may be easily identified and selected.

The computer used to facilitate the virtual visit may also be configured to access a directory of storage device 151 of the facility 110 being visited and may select archived video from that directory in response to user input. The directory may be shown on a display of the computer used to facilitate the virtual visit, and a user may select the desired archived video from the displayed directory. The directory may show a listing of the archived video by the date and time the archived video was recorded and/or by the area of the location or store being visited to which the video corresponds. For example, the directory may include an identifier of the area, and video associated with that particular area may be sorted chronologically. The computer used to facilitate the virtual visit may send a request to the facility being visited for the selected archived video in response to the user selecting the archived video from the directory.

In some implementations, a virtual visit may be facilitated using a web (e.g., Internet) conferencing platform or tool, such as MICROSOFT Office Live Meeting. That is, the virtual visit may be conducted via a web conference. For example, computer-readable instructions may be stored in the memories of computers $150_1$ to $150_N$, 160, 180, 185, and/or 190 respectively, and such instructions may allow the respective computers to participate in a web conference. For example, software for MICROSOFT Office Live Meeting, available from the MICROSOFT Corporation (Redmond, Wash.), may be stored in the memories of the respective computers. Other appropriate web conferencing utilities may also be used to facilitate a virtual visit.

When conducting a virtual visit of a facility 110 using a web conferencing tool, live or streaming video may be sent from one or more selected cameras 140 at the facility to the computer used to facilitate the visit, e.g., computer 180 or a computer 185. The computer used to facilitate the visit may then import the live video into the web conferencing tool, e.g., by uploading the live video onto data network 158, such as onto a web conferencing server 195 on data network 158, in response to user inputs to the computer. The uploaded video may then be distributed to and displayed on the computers that are participating in the virtual visit. Importing the live video may include displaying, on the computer used to facilitate the visit, the camera directory of the computer 150 at the facility 110 being visited, and selecting the camera from which the live video is to be obtained from the directory. In some implementations, only the facilitating computer and a computer at the location being virtually visited are part of the virtual visit. In other implementations, additional locations may observe the virtual visit or participate therein.

Similarly, archived video stored in a storage device 151 of the computer 150 at the facility 110 being visited may be sent to the computer facilitating the visit, imported into the web conferencing tool, and distributed to and displayed on the computers that are participating in the virtual visit. For example, importing archived video may involve displaying, on the computer facilitating the visit, the directory of the storage device 151 of the computer 150 at the facility 110 being visited, and selecting the archived video from the directory.

A virtual visit may also include one or more individuals who may be physically located at and/or report to the facility being visited, e.g., facility-level personnel, such as a facility team leader and individuals responsible for various areas of the facility being visited. For example, these individuals may participate in the visit using the computer 150 at the facility being visited, such as computer $150_1$ for facility $110_1$, and/or other computers 160 at the facility being visited, such as computers $160_1$ for facility $110_1$.

In certain implementations, a facility team leader or other individual located at the facility being visited may operate a mobile video recording device as part of the virtual visit. For example, in addition to viewing video from the monitoring system 130 of the facility 110, the virtual visit may also include video recorded with a mobile video recording device, such as a digital video camera, a webcam, a PDA with video recording features, a cellular telephone with video recording features, a netbook, or the like. The video from the mobile video recording device may be uploaded to the computer 150 at facility 110, and may subsequently be distributed to the other computers participating in the virtual visit. Video from the mobile video recording device may be uploaded in real-time during the virtual visit, e.g., via a wireless network, a Bluetooth connection, a radio network, or the like. The use of a mobile video recording device may allow a greater level of interactivity for the virtual visit, and may allow different angles or areas of the facility to be seen, such as certain angles or areas that are not visible to the monitoring system 130 of the facility 110.

In some implementations, the individual with the mobile recording device moves around the facility 110 allowing the virtual visit to cover multiple areas of the facility 110 that are not viewable with the monitoring system 130. The user or users controlling the virtual visit instruct the individual with the mobile recording device what areas of the facility the individual needs to visit and record video for presentation in the virtual visit. The individual with the mobile recording device optionally moves throughout the facility 110 on their own to display areas of the facility 110 not viewable by the monitoring system 130. While visiting specified areas, the individual with the mobile recording device receives instructions on where to point the mobile video recording device and if they should zoom the camera in or not. For example, the mobile recording device is zoomed in to capture a price tag or to capture specific display information.

In certain implementations, the individual with the mobile recording device has a live audio connection with one or more people participating in the virtual visit. The participants relay instructions to the individual with the mobile recording device. For example, the individual is instructed to move to specific areas of the facility 110 in order to have video of the specific areas displayed in the virtual visit. In some implementations, while the individual is moving through the facility 110 participants instruct the individual to turn left, turn right, or to continue walking forward. Other instructions include zooming the camera image in or out, or moving to location "x" in the facility 110. The audio connection is bidirectional, e.g., participants in the virtual visit send instructions to the individual with the mobile recording device and the individual is able to provide feedback relating to those instructions. In other implementations, the audio connection is unidirectional, e.g., the individual with the mobile recording device receives audio instructions and moves to the specified area of the facility 100; however, the individual is unable to send audio responses or confirmation back to participants of the virtual visit.

The video stream from the mobile recording device is uploaded to the computer 150 at the facility 110. The video stream is uploaded wirelessly via a wireless network. In other implementations, the video stream is uploaded to the computer 150 via a secure Bluetooth connection. In certain implementations, the video stream contains still images taken by the individual with the mobile recording device instead of or in addition to motion video. The individual with the mobile recording device takes still images of predetermined areas of the facility 110. The predetermined areas are determined at the time the virtual visit is scheduled and focus on areas of the facility 110 that will be discussed during the virtual visit. In other implementations, the individual with the mobile recording device receives live instructions from participants in the virtual visit telling the individual to take still images of specific areas of the facility 110.

In certain implementations, the mobile recording device is transported with an automated machine. The automated machine moves along a path uploaded onto a computer on the automated machine. The path includes coordinate locations at the facility 110 that the automated machine travels between. The coordinate locations are GPS locations. In other embodiments, the coordination locations are X/Y coordinates of the location 110. The automated machine uploads a video stream of the facility 110 to the computer 150 for later use during a virtual visit. In some embodiments, the automated machine is operated by a user controlling the virtual visit. The user receives a live feed from the automated machine and issues instructions to the automated machine telling the automated machine where to go in the facility 110. In some implementations, the automated machine has more than one mobile recording device, allowing the automated machine to upload images from multiple areas of the facility 110 at the same time. For example, the automated machine uploads both video streams and still images at the same time.

In certain implementations, the individual with the mobile recording device progresses on a predetermined path. The video is streamed live to the web conferencing tool for review by the participants in the virtual visit. In other implementations, the mobile recording device streams video to a server, such as the storage device 151, in order to archive the video stream. In some implementations, the video stream from the mobile recording device is a live video feed for a virtual visit while at the same time the video stream is archived to the storage device 151. When the video stream from the mobile recording device is both a live feed and is archived on the storage device 151, a user of the virtual visit optionally stops the live feed in order to review the currently displayed frame. The user has the option of continuing to view the video stream in a delayed mode from where the video stream was stopped, e.g., the video stream is no longer live, or displaying the live video stream. When the user selects to go back to the live video stream they do not view all of the video recorded by the mobile recording device, e.g., the user does not see the video that was recorded from the time they stopped to review a frame of the video to the time that they continue playing the video stream. Stopping or pausing of the video stream allows participants of the virtual visit to discuss and review in detail specific areas of the facility 110.

The mobile recording device connects to the computer 150 at the facility 110 via a secured wireless connection, e.g., 802.11. In other implementations, the mobile recording device connects to the computer 150 with a Bluetooth connection. In some implementations, the computer 150 is part of a facility security server that receives video from all of the cameras 140 at the facility 110. The computer 150 stores video data from the cameras 140 and the mobile recording device onto disk. The computer 150 allows remote users, such as a user of the computer 180, to log into the security server and view the video data stored there. In some implementations, the user of the computer 180 uses the video data in a virtual visit of the facility 110. In certain implementations, the mobile recording device connects directly to the computer 180 over a cellular network. For example, the mobile recording device is a smart phone that sends video data to the computer 180 over a secured Internet connection. The computer 180 receives and stores the video data and allows a user of the computer 180 to display some or all of the video data in a virtual visit of the facility 110. In other implementations, the mobile recording device connects wirelessly to the computer 150 and sends video data to the computer 180 via a connection between the computer 150 and the computer 180. The computer 150 and the computer 180 transmit information by way of a secured Internet connection. In some implementations, the computer 180 and the computer 150 are connected directly together with an optical cable.

Comparison between live video streams and archived video streams is easier when the individual with the mobile recording device travels on a predetermined path through the facility 110. A user of the computer 180 conducting a virtual visit compares the archived video stream with a live video stream (or an archived video stream from another date/time) such that both video streams display the same area of the facility 110 at the same time or with minimal delay. This allows the participants of the virtual visit to make better comparisons between the two video streams and the changes made at the facility 110 between the two times. In some implementations, the user displays three or more video streams of the same area during a single virtual visit in order to monitor a longer progression of data at the facility 110.

In addition, the virtual visit may include individuals who may be physically located at and/or report to a central facility, such as facility 170, e.g., corporate-level personnel, such as corporate executives or other individuals who normally physically visit stores. For example, these individuals may participate in the visit using computers at the central facility, such as computer 180 and/or other computers 185 at facility 170. Individuals may also participate from other remote locations that are not included in the monitoring network 100, such as hotels, libraries, etc., via data network 158 using external computers, such as computers 190. For example, a computer 190 may be a portable computer being used by one of the individuals participating in the visit.

During a virtual visit, various types of information (e.g., performance data, sales data, theft data, alarm data, etc.) related to the status of an area being visited may be displayed concurrently with the video of that area. That is, the video from an area and information about that displayed area may be displayed concurrently, and may be displayed on each of the computers participating in the virtual visit. Such a display of the information along with the video may facilitate improved discussion by the individuals participating in the virtual visit. For example, if a virtual visit only showed portions of a live video of a particular area that was in disarray, the participants may not know if the disarray was longstanding or had occurred shortly before the virtual visit began. On the other hand, if a virtual visit showing the same area of disarray also included information that the area had been that way for a substantial amount of time, including perhaps in previous virtual visits, the participants would have a better understanding of the magnitude of the problems at the facility.

The information discussed above may be stored in the storage device 151 at the facility 110 being visited, such as storage device $151_1$ of computer $150_1$ for facility $110_1$. In such an implementation, the information may be sent to the computer facilitating the virtual visit and then sent to the participating computers. The information may be contained in a formatted electronic document, such as a MICROSOFT PowerPoint document, a MICROSOFT Word document, a Portable Document Format (PDF) document, a Tag Image File Format (TIFF) document, a Joint Photographic Experts Group (JPEG) document, etc.

The computer used to control the virtual visit may access a directory of storage device 151 of the facility 110 being visited and may select the electronic document from that directory in response to user input into the computer used to control the virtual visit. For example, the directory may be displayed on the computer used to control the virtual visit in response to user input, and the user may then select the electronic document from the displayed directory. When using a web conferencing tool, the computer used to control the visit may import the electronic document into the web conferencing tool, e.g., by uploading the electronic document onto data network 158, such as onto a web conferencing server 195, in response to the user selecting the electronic document from the displayed directory.

Before visiting a facility 110, the computer used to control the visit, in response to user inputs, may reduce the video quality, e.g., by reducing the frame rate and/or image quality, of the video from the cameras 140 to be sent over the network. For example, the image resolution of a particular camera may be reduced in an effort to conserve bandwidth. Reducing the video quality may increase the number of camera feeds from the facility 110 being virtually visited that can be displayed concurrently on the computer used to control the virtual visit and on the participating computers. In certain implementations, the image quality of the cameras 140 at a facility 110 may be set to about 50 percent out of a total of 100 percent, and the frame rate of those cameras 140 may be set to about 7 frames/second prior to a virtual visit.

Figure 2:
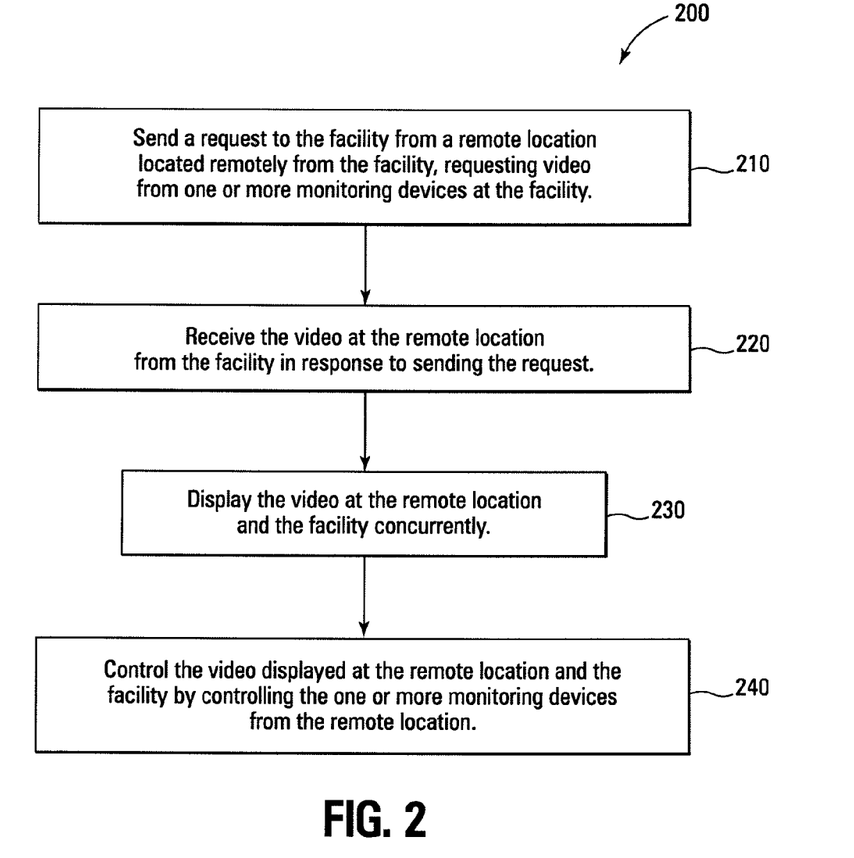
FIG. 2 is a representative flowchart of a method for conducting a virtual visit of a location.

FIG. 2 is a flowchart of a method 200 for performing a virtual visit of a location or facility, such as facility 110, according to some implementations. At block 210, a request may be sent to the facility 110 from a remote location located remotely from the facility. The request may include, for example, a selection of desired video, e.g., live or streaming video, from one or more monitoring devices, such as any of the cameras $140_1$ to $140_N$ located at the facility 110. For example, a computer that is used to facilitate the visit, such as computers 180 or 185 located at a central location, may request the video in response to user inputs into that computer.

At block 220, the video may be received at the remote location from the facility 110 being visited in response to the request. For example, video may be received at the computer that is used to facilitate the visit. At block 230, the video may be displayed at the remote location and at the facility 110 concurrently. For example, the video may be displayed on display 184 of computer 180 and on a display $154_1$ of computer $150_1$ of video monitoring system $130_1$ at the facility $110_1$ when visiting facility $110_1$.

The video displayed at the remote location and the facility being visited may be controlled from the remote location by controlling the one or more monitoring devices from the remote location at block 240. That is, the video displayed on the computer that is used to facilitate the virtual visit and at the facility being visited may be controlled by the computer that is used to facilitate the virtual visit in response to user input into the computer. For example, live video displayed on display 184 and display $154_1$ may be controlled by computer 180 in response to user inputs into computer 180.

Such control of the displayed video may involve selecting the camera 140 to display, and may also involve controlling the camera 140 itself. For example, computer 180 may be used to pan, tilt, and/or zoom a camera 140 in response to user input into computer 180 in order to obtain different views or to capture video from different areas of facility $110_1$ within the range of that camera 140. The camera 140 may be zoomed in to capture a price tag or to capture specific displays, for example.

The video may also be sent to locations other than the remote location. For example, when visiting facility $110_1$ using computer 180, the video may be sent from computer 180 to computer $150_N$ at facility $110_N$, computers 160, and/or other computers 190 that may be participating in the virtual visit. The video may be displayed at each of the other locations concurrently with displaying the video at the remote location and at the facility being visited. For example, when visiting facility $110_1$ using computer 180, the video may be displayed concurrently on display 184 of computer 180 and on display $154_1$ of computer $150_1$ and on display $154_N$ of computer $150_N$ at facility $110_N$, and/or on the displays of computers 160, 185, or 190.

The video displayed on the computer that is used to facilitate the virtual visit at the remote location and on the video monitoring system at the facility being visited may also or alternatively be controlled from the facility being visited. That is, control of the cameras may be interactive between the facility being visited and the computer used to facilitate the visit so that control of the cameras at the facility being visited can be turned over to an individual at the facility being visited. For example, when computer 180 is being used to control the visit and facility $110_1$ is being visited, control of the cameras $140_1$ to $140_M$ of video monitoring system $130_1$ may be passed from computer 180 to computer $150_1$ of video monitoring system $130_1$.

The quality of the video, e.g., the image quality and/or the frame rate, recorded by any of the cameras at the facility being visited may be adjusted at the computer used to facilitate the visit prior to requesting video from the cameras. The quality of the video may be adjusted in response to user inputs into the computer used to facilitate the visit. For example, the video quality may be reduced to conserve bandwidth and/or to facilitate displaying video from several cameras concurrently.

Adjusting the quality of video recorded by the cameras may include displaying a set-up window (e.g., sometimes called a camera configuration window) at the remote location and/or at the facility being visited. The set-up window may be used, for example, to allow a user to input the frame rate, image quality, or other settings into the set-up window. The inputs into the set-up window may be shown in the set-up window displayed at the facility being visited and displayed at other locations participating in the visit, e.g., as part of training individuals at the locations participating in the visit and at the facility being visited on how to adjust the video quality. For example, when facility $110_1$ is being visited, computer 180 may be used to facilitate the virtual visit, and one or more of facilities $110_N$ and computers 160 and 190 may be participating in the virtual visit. In the example, the set-up window may be displayed on computer 180, computer $150_1$ of facility $110_1$, and on a computer $150_N$ of another facility $110_N$, as well as on computers 160 and 190. The inputs into the set up window at computer 180 may be shown in the set-up windows displayed on computer $150_1$ and each of the other participating computers.

Camera settings, such as a camera pan angle, tilt angle, and zoom may be input, e.g., by selecting from a menu displayed on the set-up window. The camera settings input may be shown in the set-up windows displayed at the facilities participating in the visit and at the facility being visited in response to the input into the set-up window at the computer used to facilitate the visit, e.g., as part of training individuals at the facilities participating in the visit and at the facility being visited on how to pan, tilt, and/or zoom the cameras.

In some implementations, previously recorded video may be received at the computer used to facilitate the virtual visit from the facility being visited. The video may have been previously recorded by at least one of the cameras 140 at the facility being visited. For example, archived video from a certain camera 140 that is archived on the storage device 151 of the computer 150 at a facility 110 being visited may be sent to the computer used to facilitate the virtual visit in response to user input into the computer used to facilitate the virtual visit. The previously recorded video may be displayed on the computer used to facilitate the virtual visit and at the facility being visited. The previously recorded video may be displayed concurrently with live video, which may also be displayed on the computer used to facilitate the virtual visit. The previously recorded video may also be sent to other computers participating in the virtual visit, and may be displayed on these computers concurrently with live video from the same or from different cameras.

The previously recorded video from a camera 140 that is displayed on the computers participating in the virtual visit may be compared with the displayed live video from that camera 140 to determine whether any changes occurred in an area of the facility at which that camera 140 is directed. For example, the virtual visit may be a follow-up virtual visit; the previously recorded video may be from an earlier virtual visit; and the comparison may be made to determine whether changes recommended during the earlier virtual visit have been implemented. If the comparison reveals that changes were not made, reasons for not making the change or plans for implementing the changes may be discussed during the follow-up virtual visit.

Visiting an area of a facility 110 may also involve using the video to determine the status of that area, in some implementations. In particular, determining the status of an area may involve determining whether an item-display for displaying items for sale is in compliance with certain requirements. For example, a virtual visit may be used to determine whether the item-display is stocked with the proper items, whether the correct price of the items is indicated, whether the item-display is properly designed or organized, etc. Again, if this status check reveals that a certain item-display is not in compliance with recognized requirements, recommended changes or instructions may be communicated during the virtual visit.

Design drawings of an area, such as item-display, may also be displayed on the computer participating in a virtual visit, for example, in the form of electronic documents. The electronic documents may be sent from the computer used to control the virtual visit to the facility being visited and other participating computers for concurrent display in response to user input into the computer used to facilitate the virtual visit. The displayed design drawings may then be compared to the displayed video of the area to determine whether the design of the area complies with the design in the design drawings. Corrective action may be recommended in the event that the design is not in compliance. For example, a follow-up virtual visit may be performed, where archived video of the area when the item-display was not in compliance is compared to live video of the area during the follow-up to determine whether the item-display has been brought into compliance.

The compliance of many different types of areas may be analyzed via a virtual visit—e.g., an item-display, the layout of a security zone, the layout, cleanliness, and/or safety of a stockroom, a parking lot, a loading dock, facility entrances and exits, and different areas within the facility, etc. Compliance may be determined by comparing the displayed video of that area to live or archived video of a corresponding area of another facility, where the corresponding area of the other facility is known to be in compliance. For example, when visiting the area of facility $110_1$ that is captured by video camera $140_1$ of facility $110_1$, the video from video camera $140_1$ of facility $110_1$ is concurrently displayed on the computers participating in the virtual visit. In addition, video from the corresponding area, known to be in compliance, of facility $110_N$ that is captured by video camera $140_1$ of facility $110_N$ may be sent to the computer used to facilitate the virtual visit. The video of the compliant area of facility $110_N$ may then be compared to the video of the area of facility $110_1$ to determine its compliance. A follow-up virtual visit may also be performed, where archived video of the non-compliant area is compared to live video obtained during the follow-up or of archived video obtained after a certain amount of time has elapsed, to determine whether the area has been brought into compliance.

Similarly, compliance of various procedures, such as checkout procedures, guest services procedures (e.g., handling of returned items and refunds, etc.), asset-protection procedures (e.g., transporting high-priced items from the stockroom to a display location, etc.), and procedures for handling alarms (e.g., exit alarms, security-zone alarms, etc.), may be determined using virtual visits. In certain implementations, the procedure may be examined for compliance by displaying live or archived video of the procedure on the computer used to control the virtual visit, at the facility being visited, and on other participating computers concurrently. For example, archived video of various procedures performed while a facility is closed may be displayed to determine compliance with those procedures.

Compliance of procedures may also be determined from comparisons to video of procedures from other facilities known to be compliant, as discussed above in conjunction with determining the compliance of areas. For example, video of a procedure under review from a facility being visited that is concurrently displayed on the participating computers may be compared to video of a known-compliant procedure from another facility that is concurrently displayed with the video of the procedure under review. In the event a non-compliant procedure is identified, a recommendation may be made for bringing the procedure into compliance. In addition, a follow-up virtual visit may be performed, where archived video of the non-compliant procedure is compared to live video obtained during the follow-up, or is compared to archived video obtained after a certain amount of time has elapsed, to determine whether the procedure has been brought into compliance.

In some implementations, a timer may be superimposed on live or archived video that is concurrently displayed on the computers participating in the virtual visit. Using the superimposed timer, the virtual visit may be used to time a procedure, such as a checkout procedure, a return/refund procedure, etc., to determine whether the procedure occurs within a certain amount of time. For example, if an elapsed time determined from the timer exceeds the certain amount of time, it may be determined that the procedure is non-compliant, and suggestions for bringing the procedure into compliance by reducing the time can be made. A follow-up virtual visit may also be performed to determine whether the procedure has been brought into compliance.

Using archived video of a facility 110 for a virtual visit instead of live video creates a retroactive virtual visit corresponding to the time the archived video was recorded. Such a retroactive virtual visit may be useful in a situation where, for example, something out of the ordinary occurred on a given date, and the reason for the occurrence was being investigated. In addition, the use of archived video for a virtual visit may be helpful to review relatively lengthy procedures, such that a user can be fast-forward through the irrelevant portions of the procedure to reduce the review time compared to reviewing a procedure in real time from live video. Archived video may also be used to review procedures that are typically performed while a facility 110 is closed, such as stocking procedures, procedures for unloading merchandise from trucks at a loading dock, etc.

Figure 3:
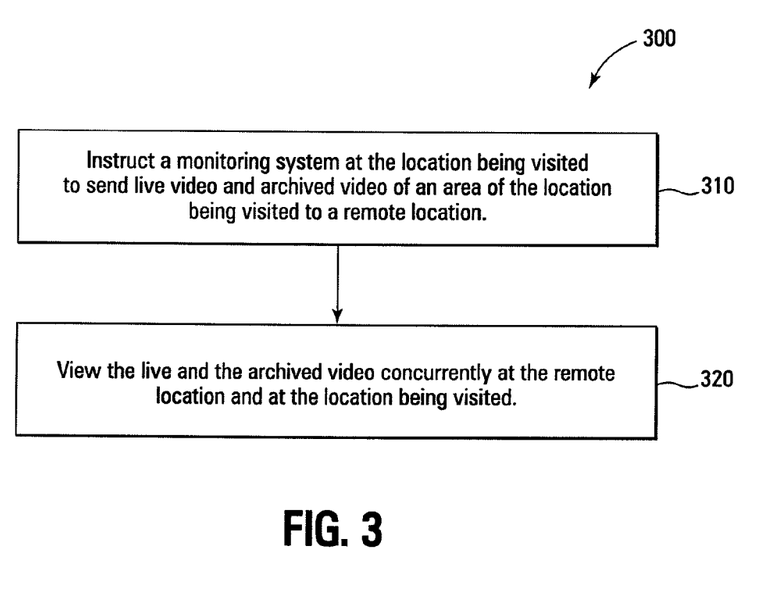
FIG. 3 is a representative flowchart of another method for conducting a virtual visit of a location.

FIG. 3 is another example flowchart of a method 300 for performing a virtual visit of a location. At block 310, a monitoring system at the location being visited may be instructed to send live video and archived video of an area of the location being visited to a remote location. For example, a computer that is used to control the visit, such as computer 180 or a computer 185 located at a central facility, may send a request or an instruction to computer 150 of a video monitoring system 130 of a facility 110 being visited in response to user inputs into the computer that is controlling the visit. The computer that is used to control the visit may send the request for the live video in response to the user selecting the camera that is recording the live video from a camera directory of the location being visited that is displayed on the computer that is controlling the visit. The computer that is used to control the visit may also send a request for the archived video in response to the user selecting that archived video from a directory of a storage device, e.g., a storage device 151, of the location being visited that is displayed on the computer that is controlling the visit.

The live video and the archived video may be viewed concurrently at the remote location and the location being visited at block 320. That is, the live video and the archived video may be received from the location being visited at the remote location in response to requests to the monitoring system to send the live and archived video. The live and archived video may be displayed concurrently for viewing at the remote location and at the location being visited. The viewing of the live and archived video at the remote location and the viewing of the live and archived video at the location being visited may occur concurrently.

The live video and archived video may be compared to determine whether a change in an area of the location being visited captured in the live and archived video has occurred. For example, the virtual visit may be a follow-up visit; the live video may show the state of an area of the facility being visited during the follow-up visit; the archived video may show the state of that area of the facility during a previous visit; and the comparison may determine whether the state of the area has been changed, e.g., according to recommendations made during the previous visit.

The live and archived video may be sent to at least one other location from the remote location. For example, the live and archived video may be sent to at least one other location, such as another facility 110, and/or to at least one computer 190 from the computer that is used to control the visit. The live and archived video may then be concurrently viewed at the at least one other location. For example, the live and archived video may be concurrently displayed at the other location for viewing. Note that the viewing of the live and archived video at the at least one other location may occur concurrently with the viewing of the live and archived video at the remote location and at the location being visited.

In some implementations, information about a first state of the area of the location being visited in the live video and about a second state of the area of the location being visited in the archived video may be viewed concurrently with the live and archived video. For example, the information may be displayed concurrently with the live and archived video on the computer used to control the visit and on a computer at the location being visited. This information may be data related to the particular location being visited, and may include, for example, performance data, sales data, theft data, alarm data, etc.

The information may be contained in an electronic document that can be sent to the computer that is used to control the visit from a storage device 151 at the location being visited in response to a request from the computer controlling the visit, e.g., in response to a user input. The user input may involve selecting the electronic document from a directory of the storage device 151 displayed on the computer.

Figure 4:
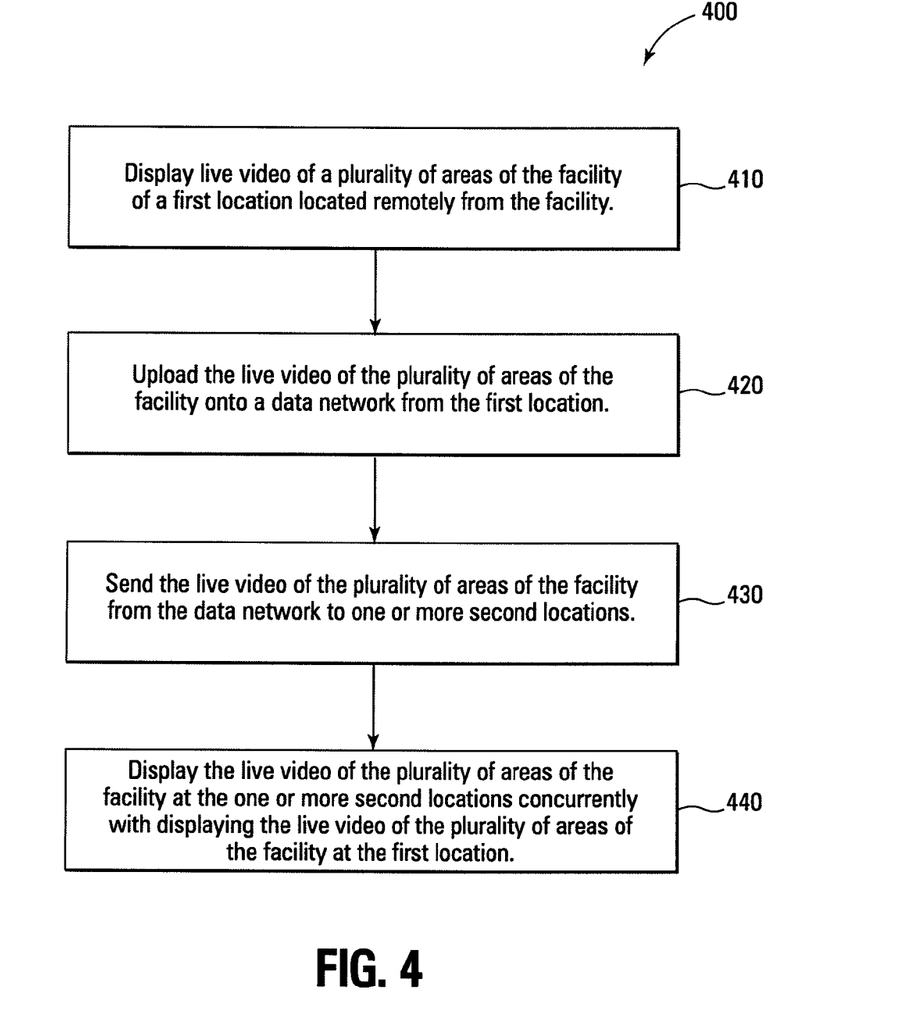
FIG. 4 is a representative flowchart of another method for conducting a virtual visit of a location.
Like reference symbols in the various drawings indicate like elements.

FIG. 4 is a flowchart of a method 400 for performing a remotely initiated visit of a facility or a location, such as a facility 110. At block 410, live video of a plurality of areas of the facility may be displayed at a first location located remotely from the facility. For example, the live video may be displayed at the computer used to control the visit, such as computer 180 located at a central facility. A request may be sent to the facility from the computer used to control the visit, requesting the live video. The live video of the plurality of areas of the facility 110 may then be received at the computer used to control the visit in response to the request for display.

The live video of the plurality of areas of the facility may be uploaded onto a data network, such as data network 158, from the first location at block 420. For example, the live video may be uploaded onto data network 158 upon importing the video into a web conferencing tool at the computer used to control the visit. At block 430, the live video of the plurality of areas of the facility may be sent from the data network to one or more second locations. For example, the live video may be sent from the computer that is used to control the visit to a computer 150 or 160 at the facility 110 that is being visited, and/or to one or more other computers that are participating in the virtual visit.

The live video of the plurality of areas of the facility may be displayed at the one or more second locations concurrently with displaying the live video of the plurality of areas of the facility at the first location at block 440. For example, when live video is displayed at the first location, the live video may also be concurrently displayed at the one or more second locations.

A plurality of cameras 140 at the facility being visited may be selected from the first location or from the facility being visited for respectively obtaining the live video of the plurality of areas of the facility, where each selected camera of the plurality of cameras may obtain video from a different one of the plurality of areas of the facility (i.e., the areas correspond to the cameras on a one-to-one basis). The live video of the respective areas may be displayed concurrently at the first location, e.g., on the computer that is used to control the visit. Alternatively, the video may be sequentially displayed by selecting individual cameras. Note that the plurality of cameras 140 at the facility being visited may be selected from that facility in response to turning control of the plurality of cameras 140 over to the facility 110 from the computer that is used to control the visit.

The live video of the plurality of areas of the facility may be obtained from a single camera by panning, tilting, and/or adjusting the zoom of that camera from the first location or from the facility being visited in order to capture different areas of the plurality areas of the facility being visited. The live video of the plurality of areas may be respectively displayed at different instants of time as the video of the different areas is obtained by panning, tilting, and/or zooming. For example, the video of the different areas may be displayed sequentially as the different areas are captured. The live video of the plurality of areas of the facility may be obtained by panning, tilting, and/or adjusting the zoom of more than one of the video cameras $140_1$ to $140_M$ at the first location or at the facility being visited.

Note that control of the cameras 140 at the facility being visited, such as by panning, tilting, and/or zooming, may be interactive between the facility and the computer used to control the virtual visit at the first location. For example, during the visit, control of the cameras 140 may be passed from the computer used to control the virtual visit to any of the computers at the facility.

A number of implementations have been described. Nevertheless, it will be understood that various modifications may be made without departing from the spirit and scope of the systems and methods described herein. For example, the steps of various procedures are described as occurring in a certain order, but many of the steps may occur either simultaneously or in a different order than described. Accordingly, other implementations are within the scope of the following claims.

What is claimed is:

1. A computer-implemented method for performing a collaborative virtual tour of a facility, comprising:
   providing, at a facility in a first location, a first video workstation communicatively coupled to a first video monitoring system having one or more adjustable video monitoring devices, each of the adjustable video monitoring devices being directed at an area of the facility;
   providing, at a second location that is remote from the first location, a second video workstation that is communicatively coupled to the first video workstation and that is operably coupled to one or more of the adjustable video monitoring devices of the first video monitoring system;
   initiating a collaborative virtual tour session between the first video workstation and the second video workstation;
   during the virtual tour session, displaying, concurrently on the first video workstation and the second video workstation, video captured by one or more of the adjustable video monitoring devices of the first video monitoring system; and
   during the virtual tour session, controlling, via user input to the second video workstation, the video displayed on the first video workstation and the second video workstation,
   wherein the video displayed is live video from the one or more adjustable video monitoring devices, the method further comprising displaying, concurrently with the live video, stored video that was previously recorded by at least one of the adjustable video monitoring devices, the stored video corresponding to video of the same area of the facility depicted in the live video, and comparing the stored video to the live video to determine whether any changes were made between the time of recording of the stored video and the live video.

2. The method of claim 1, further comprising controlling, via user input to the first video workstation, the video displayed on the first video workstation and the second video workstation.

3. The method of claim 1, wherein controlling includes at least one of panning, tilting, or zooming at least one of the adjustable video monitoring devices.

4. The method of claim 1, wherein controlling includes selecting an adjustable video monitoring device, and displaying video captured by the selected adjustable video monitoring device.

5. The method of claim 1, wherein controlling includes adjusting the quality of the video displayed.

6. The method of claim 5, wherein the quality of the video displayed is adjusted by changing the frame rate of the video.

7. The method of claim 1, further comprising displaying, concurrently with the video, non-video information relating to an area of the facility depicted in the video.

8. The method of claim 1, further comprising displaying, concurrently with the video, external video from a video recording device that is not a part of the video monitoring system.

9. The method of claim 1, further comprising providing, at a third location that is remote from the first location and the second location, a third video workstation that is communicatively coupled to the second video workstation;
   initiating a collaborative virtual tour session between the third video workstation and the second video workstation;
   during the virtual tour session, displaying, concurrently on the third video workstation and the second video workstation, video captured by one or more of the adjustable video monitoring devices of the first video monitoring system.

10. A computer-implemented method for performing a collaborative virtual tour of a facility, comprising:
    providing, at a facility in a first location, a first video workstation communicatively coupled to a first video monitoring system having one or more adjustable video monitoring devices, each of the adjustable video monitoring devices being directed at an area of the facility;
    providing, at a second location that is remote from the first location, a second video workstation that is communicatively coupled to the first video workstation and that is operably coupled to one or more of the adjustable video monitoring devices of the first video monitoring system;
    providing, at a third location that is remote from the first location and the second location, a third video workstation that is communicatively coupled to the second video workstation;
    initiating a collaborative virtual tour session between the first video workstation, the second video workstation, and the third video workstation;
    establishing an audio connection between a first user at the first location, a second user at the second location, and a third user at the third location;
    during the virtual tour session, displaying, concurrently on the first video workstation, the second video workstation, and the third video workstation, live video captured by one or more of the adjustable video monitoring devices of the first video monitoring system;
    during the virtual tour session, controlling, via user input to the second video workstation, the video displayed on the first video workstation, the second video workstation, and the third video workstation;
    displaying, concurrently with the video, external video from a video recording device that is not a part of the video monitoring system, the video recording device capturing images of the facility to supplement the virtual tour session;
    displaying, concurrently with the live video, stored video that was previously recorded by at least one of the adjustable video monitoring devices, the stored video corresponding to video of the same area of the facility depicted in the live video; and
    comparing the stored video to the live video to determine whether any changes were made between the time of recording of the stored video and the live video.

11. The method of claim 10, wherein controlling includes at least one of panning, tilting, or zooming at least one of the adjustable video monitoring devices.

12. The method of claim 10, wherein controlling includes selecting an adjustable video monitoring device, and displaying video captured by the selected adjustable video monitoring device.

13. The method of claim 10, wherein controlling includes adjusting the quality of the video displayed.

14. The method of claim 13, wherein the quality of the video displayed is adjusted by changing the frame rate of the video.

15. The method of claim 10, wherein the video displayed is live video from the one or more adjustable video monitoring devices, and further comprising displaying, concurrently with the live video, stored video that was previously recorded by at least one of the adjustable video monitoring devices, the stored video corresponding to video of the same area of the facility depicted in the live video.

16. The method of claim 15, further comprising comparing the stored video to the live video to determine whether any changes were made between the time of recording of the stored video and the live video.

17. The method of claim 10, further comprising displaying, concurrently with the video, non-video information relating to an area of the facility depicted in the video.

18. The method of claim 8, wherein the video recording device comprises a mobile recording device transported with an automated machine, the method further comprising moving the automated machine along a path uploaded onto the automated machine, the path including coordinate locations at the facility between which the automated machine travels.

* * * * *